United States Patent
Behl et al.

(10) Patent No.: US 12,095,797 B1
(45) Date of Patent: *Sep. 17, 2024

(54) MICROSERVICES ANOMALY DETECTION

(71) Applicant: CITIBANK, N.A., New York, NY (US)

(72) Inventors: Sunny Behl, Irving, TX (US);
Hariharan Badrinathan, Tamilnadu (IN)

(73) Assignee: CITIBANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,020

(22) Filed: Aug. 28, 2023

Related U.S. Application Data

(63) Continuation of application No. 18/138,883, filed on Apr. 25, 2023, now Pat. No. 11,743,281.

(51) Int. Cl.
*H04L 9/40* (2022.01)
*H04L 41/16* (2022.01)

(52) U.S. Cl.
CPC .......... *H04L 63/1425* (2013.01); *H04L 41/16* (2013.01)

(58) Field of Classification Search
CPC ............................ H04L 63/1425; H04L 41/16
USPC .......................................................... 726/22
See application file for complete search history.

(56) References Cited

U.S. PATENT DOCUMENTS

| | | | |
|---|---|---|---|
| 11,575,697 B2* | 2/2023 | Palani | G06N 3/088 |
| 11,743,281 B1* | 8/2023 | Behl | H04L 63/1425 726/22 |
| 2017/0063905 A1* | 3/2017 | Muddu | G06N 7/01 |
| 2018/0343277 A1* | 11/2018 | Drihem | H04L 63/1441 |
| 2019/0068627 A1* | 2/2019 | Thampy | H04L 63/1425 |
| 2021/0058424 A1* | 2/2021 | Chang | G06N 3/044 |
| 2021/0200612 A1* | 7/2021 | Martyanov | G06F 40/279 |
| 2022/0172037 A1* | 6/2022 | Kang | G06F 11/3466 |
| 2022/0224723 A1* | 7/2022 | Crabtree | H04L 63/20 |
| 2023/0124621 A1* | 4/2023 | Umesh | G06F 21/577 726/23 |

OTHER PUBLICATIONS

International Search Report and Written Opinion of the International Searching Authority issued in PCT Application No. PCT/US2024/026032, mailed Jul. 24, 2024, 8 pages.

* cited by examiner

*Primary Examiner* — Badrinarayanan
*Assistant Examiner* — Badri-Champakesan
(74) *Attorney, Agent, or Firm* — Foley & Lardner LLP

(57) ABSTRACT

Presented herein are system and methods for detecting anomalies in microservices. A server may receive a first plurality of metrics from a microservice of a plurality of microservices. Each of the microservices may provide a respective function for an application independently from other microservices. The server may apply the first plurality of metrics to an ensemble of anomaly detection models to generate classifications. Each of the classifications may indicate the first plurality of metrics as one of anomalous or normal from a respective model of the ensemble. The ensemble may be trained using a second plurality of metrics from the microservice. The server may identify a majority of the plurality of classifications as indicating the first plurality of metrics as anomalous. The server may determine that at least one of the first plurality of metrics satisfies a threshold. The server may generate an alert to indicate an anomaly event.

18 Claims, 6 Drawing Sheets

MICROSERVICES ANOMALY DETECTION

CROSS REFERENCE TO RELATED APPLICATIONS

The present application claims priority under 35 U.S.C. § 120 as a continuation of U.S. patent application Ser. No. 18/138,883, titled "MICROSERVICES ANOMALY DETECTION," filed Apr. 25, 2023, which is incorporated by reference in its entirety.

TECHNICAL FIELD

This application generally relates to anomaly detection. In particular, the present application relates to detection of anomalies in microservices.

BACKGROUND

In a computer networked environment, an instrumentation service can evaluate various measured metrics using anomaly detection techniques for anomalies in individual nodes of the network or communications among nodes. Anomaly detection techniques may lead to over-counting (e.g., false positives) or under-counting (e.g., false negatives) of anomalies. Over-counting may result in the service making too many detections and sending too many notices of anomalies to a system administrator. The system administrator may be overwhelmed with alerts regarding false positive anomalies and may be unable to check each, thereby nullifying the efforts of the service. Conversely, under-counting of anomalies may result in issues in the networked environment remaining unchecked. Either result may lead to an increase in issues as ignored anomalies exacerbate any remaining problems in the environment.

SUMMARY

Disclosed herein are systems and methods for detecting anomalies in microservices. A service can receive metrics related to performance of a microservice from a multitude of microservices. Each microservice can perform a specific function for an application. The service can evaluate the metrics received from each microservices for anomalies using an ensemble of anomaly detection models. If a majority of the ensemble indicates an anomaly, the service may further check the classification according to a set of rules. If the classification of the anomaly satisfies the set of rules, the service can provide to an administrator of the microservice an alert of the anomaly. The administrator can then take an appropriate action in relation to the anomaly to address potential issues.

There are many technical shortcomings associated with microservice anomaly detection, such as false positives and an overwhelming amount of alerts for an administrator to handle. From the perspective of the service, a service lacks the ability to identify and classify anomalies based on type of error, or time of occurrence, among others. Furthermore, the quantity of false positives and the interdependence of some microsystem monitoring systems would make instituting such a classification system innately erroneous. A large amount of false positive anomalies can further provide a hindrance to a system administrator. There may be no trackers for these alerts that measure the number of true alerts and false alarms. The system administrator may have to manually sort through all alerts to identify the true anomalies from the false. While the deterioration of any one of these microservices may not cause any critical incidents immediately, when unattended for a prolonged period of time anomalies may build up and may start having effects on the business functionalities like slow response or increased failures in the business transactions.

To address these and other technical challenges, the service receiving the metrics may monitor the performance of each microservice independently. The service may collect historical metrics to develop an ensemble of machine learning models (e.g., Isolation Forest, density-based spatial clustering of applications with noise (DBSCAN), multivariate Gaussian distribution model) in order to more accurately detect anomalies. The service may use the ensemble to create classifications of the metrics received from each microservice. The service may then determine whether a majority of the models of the ensemble detect an anomaly of each classification and may suppress classifications or microservices outside of a range of anomaly detection. The metrics, suppressed classifications and microservices, and anomalous information can be stored at any time and can further be used to continuously train each model of the ensemble to improve precision and accuracy of the ensemble and each individual model. With the detection of anomalous metrics within a classification, the service can generate and transmit an alert. The alert can be received by one or more system administrators or displayed on a dashboard.

In this manner, the service may use the ensemble of machine learning modes to reduce false positives at several points (e.g., at modeling, classification, and suppression). Furthermore, classification of metrics by the models can create a history of anomalous microservices or metrics. This reduction in false positives and classifications of metrics can provide concise and useful information to a system administrator, as opposed to unwieldly numbers of false positives to sort through. Furthermore, a microservice can be more efficiently serviced in the event of an anomaly, by noticing trends related to anomalous behavior as well as more concisely pinpointing the type of anomaly the microservice is experiencing. This can set up a framework to monitor the performance of critical microservices continuously and trigger alerts proactively whenever the microservices metrics look anomalous. Streamlining the diagnosis of problematic microservices can reduce network congestion, such as bandwidth consumed by malfunctioning microservices. Moreover, this service can reduce overall computational resources spent on malfunctioning microservices by more quickly targeting their failures and thereby simplifying rectification of the issue at hand.

Aspects of the present disclosure are directed to systems, methods, and non-transitory computer readable media for detection of anomalies in microservices. A server may receive a first set of metrics from a microservice of a set of microservices. Each of the set of microservices may be configured to provide a respective function for an application independently from other microservices of the set of microservices. The server may apply the first set of metrics to an ensemble of anomaly detection models for the microservice to generate a set of classifications. Each of the set of classifications can indicate the first set of metrics as one of anomalous or normal from a respective model of the ensemble of anomaly detection models. The ensemble of anomaly detection models can be trained using a second set of metrics from the microservice. The server may identify a majority of the set of classifications generated by the ensemble of anomaly detection models as indicating the first set of metrics as anomalous. The server may determine, responsive to identifying the majority of the set of classifications as anomalous, that at least one of the first set of metrics satisfies a respective threshold for the microservice. The server may generate an alert to indicate an anomaly event in the microservice configured to the function for the application, in response to determining that at least one of the first set of metrics satisfies the respective threshold.

In some embodiments, the server may determine, responsive to identifying the majority of the set of classifications as anomalous, that the first set of metrics satisfies a rule to avoid false positives. The server may suppress the alert to indicate the anomaly event in response to determining that the first set of metrics satisfies the rule to avoid false positives. In some embodiments, the server may determine, responsive to identifying the majority of the set of classifications as anomalous, that the first set of metrics does not satisfy a rule to avoid false positives. The server may maintain the alert to indicate the anomaly event in response to determining that the first plurality of metrics does not satisfy the rule to avoid false positives.

In some embodiments, the server may identify an addition of the microservice to the set of microservices for the application. The server may train the ensemble of anomaly detection models individually in accordance with unsupervised learning using the second set of metrics from the microservice aggregated over a time period, prior to the first set of metrics. In some embodiments, the server may suppress, responsive to identifying less than the majority of the set of classifications as anomalous, generation of the alert to indicate the anomaly event in the microservice.

In some embodiments, the server may determine the respective threshold for the microservice to compare with the at least one of the first set of metrics over a first time period, based on the second set of metrics over a second time period. In some embodiments, the server may select, from a set of time periods corresponding to a set of tier levels, a time period over which to aggregate the first set of metrics from the microservice, in accordance with a tier level for the microservice. In some embodiments, the server may apply log data for the microservice to an exception detection model to determine at least one of the set of classifications for the microservice.

In some embodiments, generating the alert further includes generating a message to indicate, to an administrator device for the set of microservices, the anomaly event for the respective function for the application corresponding to the microservice. In some embodiments, the server may provide, for presentation on a dashboard interface, information based on at least one of (i) the application, (ii) the microservice, (iii) the first set of metrics, (iv) the set of classifications, or (v) the alert to indicate the anomaly event.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and, together with the specification, explain the subject matter of the disclosure.

DETAILED DESCRIPTION

Figure 1:
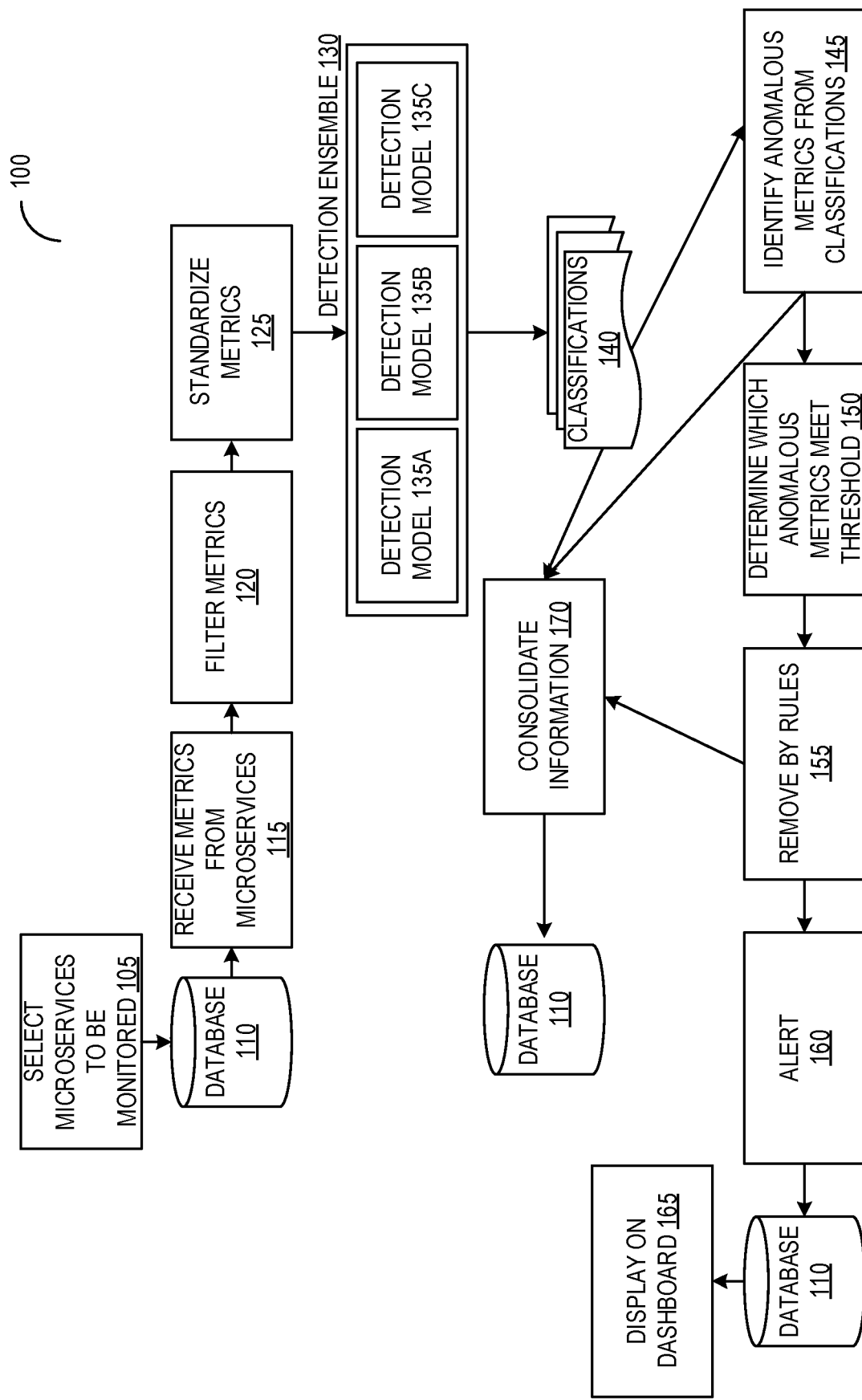
FIG. 1 illustrates a flow diagram of an example process for microservice anomaly detection in accordance with an illustrative embodiment.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

The present disclosure is directed to systems and methods of microservice anomaly detection. A server can receive a set of metrics from one or more microservices. The service may collect historical metrics to develop an ensemble of machine learning models in order to more accurately detect anomalies. The service may use the ensemble to create a classification of the metrics received by each microservice. The service may then determine if a majority of the models of the ensemble detect an anomaly of each classification and may suppress classifications or microservices outside of a range of anomaly detection. Subsequent to the detection of anomalous metrics within a classification, the service can generate and transmit an alert. This detection technique can reduce false positives at several points. Furthermore, classification of metrics by the models can create a history of anomalous microservices or metrics. In this manner, a microservice can be more efficiently serviced in the event of an anomaly, through reduction in false positives and classifications of metrics. This can increase overall functionality of the application as well as reduce computing resources.

FIG. 1 depicts a flow diagram of an example process 100 for microservice anomaly detection. The process 100 may include several operations (operations 105-170) to be performed by a service that receives a set of metrics from one or more microservices (operations 105-115), processes the metrics (operations 120-125), classifies the metrics (operations 130-140), determines anomalies (operations 145-155), and generates an alert and stores the data (operations 160-170). The process 100 may contain more or fewer operations than depicted herein.

In operation 105, microservices are selected to be monitored. The microservices can be independently operating microservices which serve a function for an application. The microservices selected to be monitored can be maintained in a master list. The microservices can be selected by at least a user (such as a system admin) or by an automatic system for monitoring such as a system that can accept requests and automatically update the master list. Microservices can be added or removed from the master list at any time, such as periodically (e.g., daily, weekly), with the addition of a new metric, with the disablement of a metric, or with the determination that a metric is operating anomalously.

In operation 115, the server receives a set of metrics from the one or more microservices. The server can receive the set of metrics by retrieving them from a database 110, from the microservices individually or collectively, or from a network. Likewise, the database or microservices can transmit the metrics to the server. The metrics can include information pertaining to the operation and functionality of a microservice. Each microservice can send metrics indicative of performance. The server can receive metrics at least periodically, in response to a change in a microservice, by a push from an administrator. Metrics can be aggregated or collected by the server for a period of time, such as weeks, months, or years, among others. The system can receive the metrics as a data object, such as a list, table, or JSON object, among others.

In operation 120, the server filters the metrics. The server can filter the metrics according to one or more filter criteria, including at least average response time, calls per minute, errors per minute, or full garbage collection pause time, described herein. The server can filter the metrics based on time received. Filtering can also include removing null values from the metrics. For example, null values may occur when a system update is installing, or when a microservice is taken offline for a period of time. The system can filter out these null values within the metrics as to at least prevent data skewing.

In operation 125, the server standardizes or normalizes the metrics. The server can standardize the metrics associated with each microservice individually, as a group or as subgroups. Standardizing the data can refer to altering the metrics to reflect a specific statistical mean or variance. For example, standardizing the data can refer to manipulating the metrics to exhibit a mean of 0 and a standard deviation of 1. In some embodiments, standardizing the metrics can enable easier calculations and comparison across metrics.

Using the metrics, an ensemble 130 of detection algorithms may be created. The detection ensemble can include a multitude of different models (e.g., models 135A-C). The ensemble 130 can enable an evaluation of the metrics by each model to be amalgamated to derive a final estimate, and a prediction, among others. The ensemble can build a generalized model by reducing bias that could be introduced by using only a single model. Each model 135 of the ensemble acts upon the metrics. The models can include models such as DBSCAN, Isolation Forest, or multivariate Gaussian distribution and can perform one or more functionalities on the set of metrics to prepare them for classification. The models can include models different from or in addition to the models listed herein. Each model can evaluate the metrics to determine if a microservice is suffering from an anomaly.

In operation 140, the metrics are classified. The metrics can be classified into one or more classifications. For example, classifications can include "anomalous" and "normal." Metrics of the set of metrics can be classified as anomalous or normal. The metrics of a microservice being classified as anomalous or normal can indicate that the microservice that includes the set of metrics is anomalous or normal, respectively. The classifications can be stored in the database 110.

In operation 145, the server identifies anomalous metrics from the classifications. The server can determine anomalous metrics from the classifications created in operation 140 by combining the classifications in the ensemble. The classifications from each model can be combined at least additively, with a weight assigned to each model, or by a majority voting means. For example, in an ensemble consisting of three models, if two of the models determine a metric to be indicative of an anomaly, the ensemble can classify the metric as anomalous.

In operation 150, the server determines which anomalous metrics meet a threshold. Thresholds can be established for each metric of the set of metrics, for a subset of the metrics, or for the combination of metrics for each microservice. A threshold can be determined from collected metrics over a period of time. For example, a threshold can be determined from metrics collected from a microservice over a ten-week period. For example, a threshold can be set at a 95% percentile of the anomalous metrics. That is to say, identified anomalous metrics that are within the 5% historically least anomalous can be considered to not meet the threshold. As a more specific example, the 95% percentile of call response time may be 10 ms. In this example, any metrics indicating a call response time of less than 10 ms do not meet the threshold. The server can disregard metrics not meeting the threshold as false positives.

In operation 155, the server removes metrics which do not meet a rule. The server can determine if the metrics which have met the threshold also meet a rule of a set of rules. The server can remove, suppress, or disregard metrics which do not meet the rule as false positives. A rule can be, for example, that all metrics except "errors per minute" are within the threshold and the "errors per minute" value is less than ten. A rule can be, for example, that "errors per minute" is less than 1% of the "calls per minute" value. A rule can be, for example, that all metrics except "average response time" are within threshold and "average response time" is less than twice its mean value. Other rules can exist within the set of rules. With the removal of anomalies based on not meeting a rule, the server can generate an alert.

In operation 160, the server generates an alert for transmittal. The server can generate an alert for transmission to a database, to an administrator, or for display at least. The alert can be an email, an SMS message, or another notification means. The alert can be stored in the database 110. The alert can indicate to an administrator that a microservice has been identified as anomalous. The alert can include information relating to the metrics, model determinations, and classifications, as well as other information contained within the system.

In operation 165, the server displays the alert on a dashboard. The dashboard can be a graphical user interface for informing an administrator of a microservice anomaly. The dashboard can display metrics, listings of microservices, times of alerts, as well as other information pertinent to the system. In operation 170, the server consolidates the information. The server can amalgamate information related to the system at any time, such as in response to new information or periodically. Information can be organized into a data structure such as JSON data structure, trees, tables, lists. Various information may be stored in a database. Information stored can include at least normal metrics, anomalous metrics, classifications, lists of microservices, alert data, or thresholds. The system can access the database at any time to store information, such as periodically, responsive to new information (e.g., a new microservice or new metrics), or manually.

Figure 2:
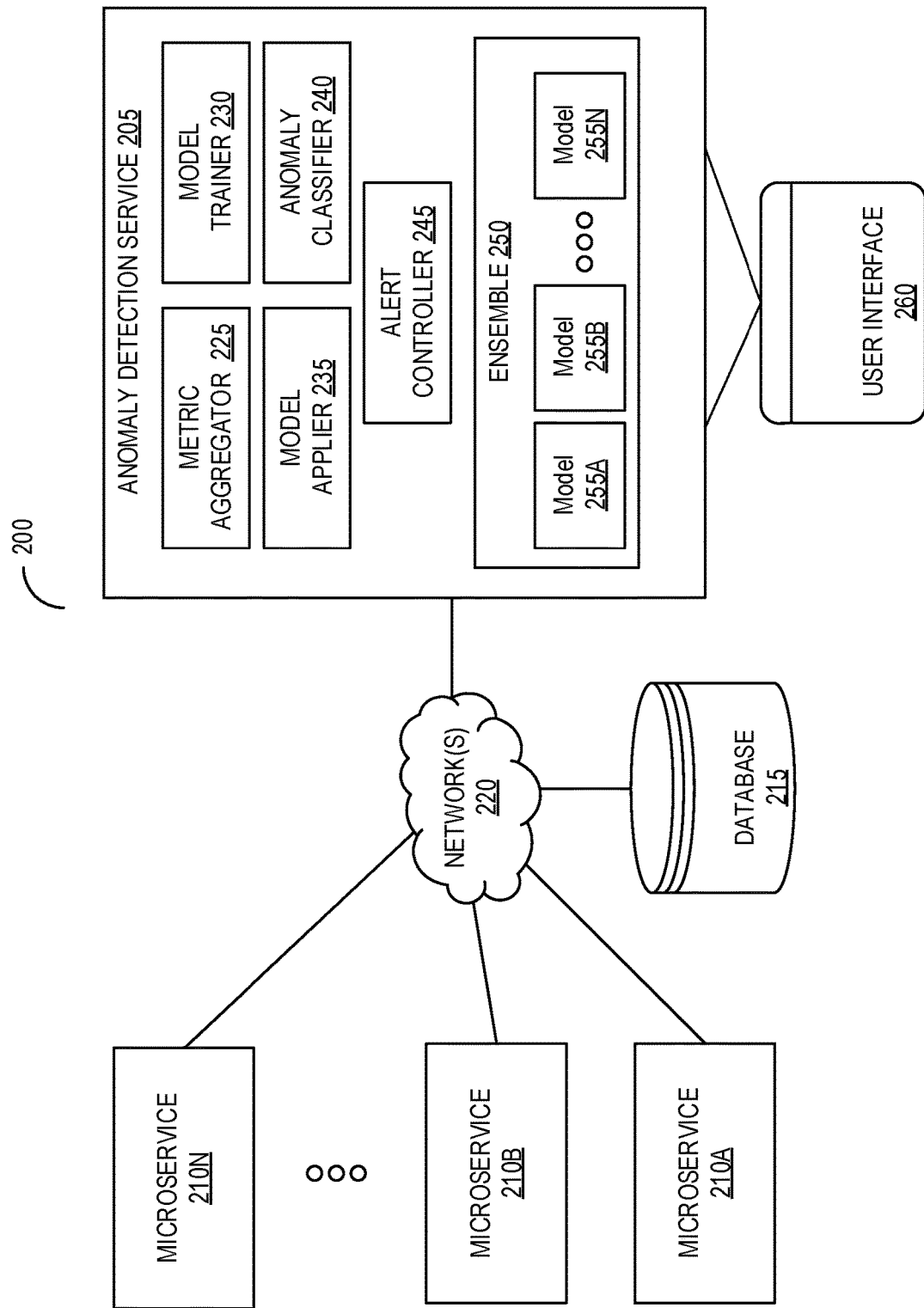
FIG. 2 illustrates a block diagram of an example system for identifying anomalies in microservices in accordance with an illustrative embodiment.

FIG. 2 depicts a block diagram of a system 200 for identifying anomalies in microservices. The system 200 may include one or more microservices 210A-N (hereinafter generally referred to as a microservice 210), at least one anomaly detection service 205, and a database 215, coupled with one another via at least one network 220. The anomaly detection service 205 may include at least one metric aggregator 225, at least one model trainer 230, at least one model applier 235, at least one anomaly classifier 240, at least one alert controller 245, and an ensemble 250, among others, and provide at least one user interface 260. The ensemble 250 may include a set of models 255A-N (hereinafter generally referred to as models 255).

Embodiments may comprise additional or alternative components or omit certain components from those of FIG. 2 and still fall within the scope of this disclosure. For example, the database 215 and the anomaly detection service 205 may be part of the same device. Various hardware and software components of one or more public or private networks 220 may interconnect the various components of the system 200. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The microservices 210 are a set of independently operating subsystems which perform a function for an application. The microservices 210 can each perform a function for the application independently of the other microservices 210. The application can be a software application operating on a user device. In this manner, one or more microservices of the microservices 210 can malfunction (e.g., not perform its function, perform its function incorrectly, or perform its function below a quality threshold) without impacting the operation of the other microservices 210. The microservices 210 can be independently monitored. The microservices 210 may transmit metrics to the anomaly detection service 205.

The microservice 210A can be one of the many microservices 210, each configured to provide a function for the application independently from each other. In this manner, the microservice 210A can have its own set of metrics that can indicate the functionality of the microservice 210A. The microservice 210A can malfunction independently of the many microservices 210. For example, the microservice 210A may perform below the quality threshold, perform its function incorrectly, or not perform its function at all. The set of metrics associated with the microservice 210A may indicate that the microservice 210A is malfunctioning in some capacity. The microservices 210 can each communicate with the anomaly detection service 205 to at least transmit metrics to the anomaly detection service 205.

The anomaly detection service 205 may be any computing device including one or more processors coupled with memory (e.g., the database 215) and software and capable of performing the various processes and tasks described herein. The anomaly detection service 205 may be in communication with the microservices 210, the user interface 260, the network 220, or the database 215. Although shown as a single anomaly detection service 205, the anomaly detection service 205 may include any number of computing devices. The anomaly detection service 205 may receive, retrieve, or otherwise include the set of metrics from the microservice 210A.

The anomaly detection service 205 includes several subsystems to perform the operations described herein. The anomaly detection service 205 may include a metric aggregator 225, a model trainer 230, a model applier 235, an anomaly classifier 240, an alert controller 245, or an ensemble 250 including models 255A-N. In some implementations, the metric aggregator 225 collects the metrics from each microservice 210 via the network 220. The model trainer 230 may train the ensemble 250 of models 255 using a subset of the metrics. The model applier 235 applies the model to the metrics to generate classifications of the metrics as normal or anomalous. The anomaly classifier 240 may identify that a majority of the classifications indicate that the metrics are anomalous. The alert controller 245 may determine that at least one of the metrics satisfies a threshold and may generate an alert indicating an anomaly event and may transmit that alert to a user interface 260.

Figure 3:
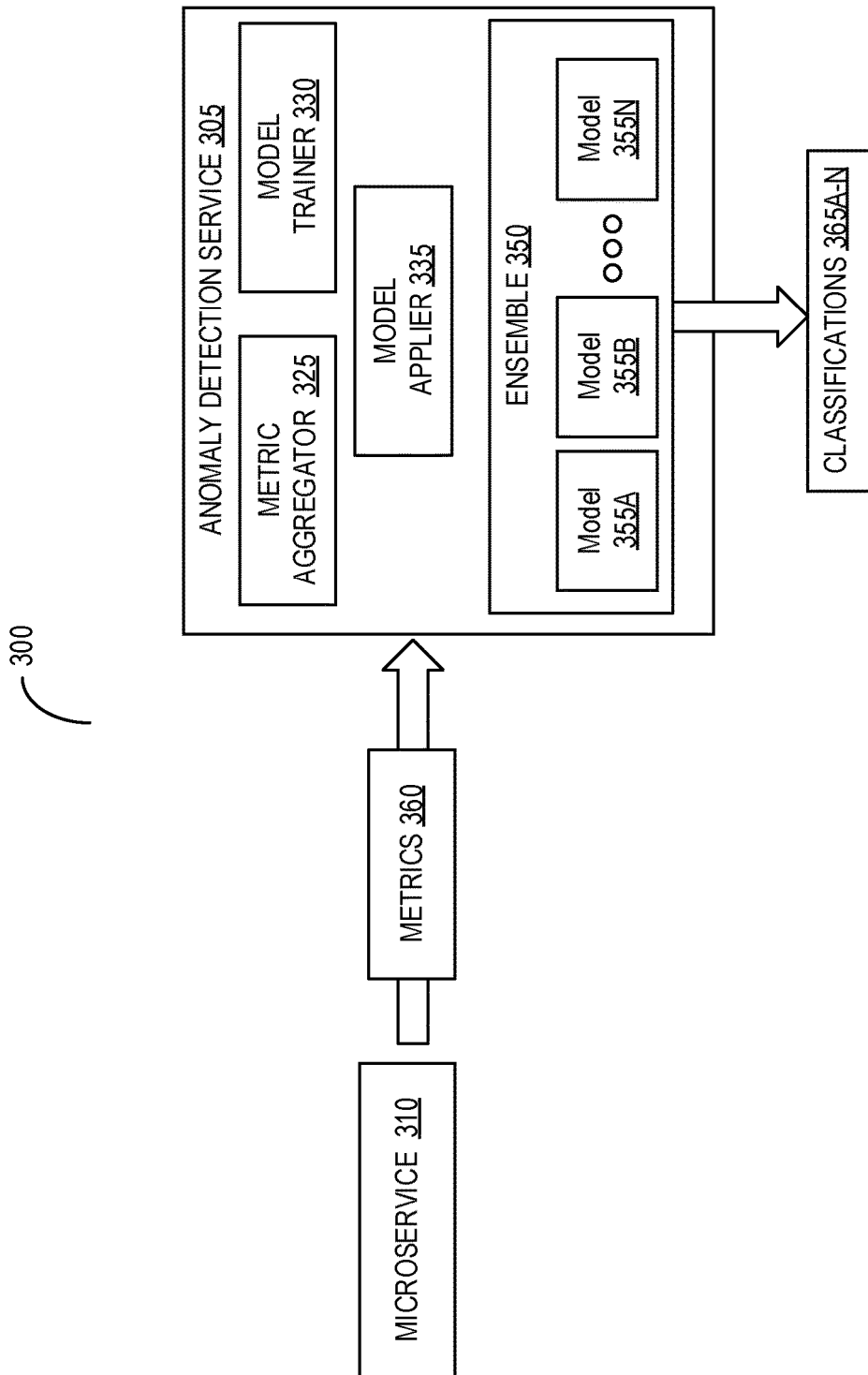
FIG. 3 illustrates a block diagram of an example system for classifying microservices as anomalous in accordance with an illustrative embodiment.

FIG. 3 depicts a block diagram of a system 300 for classifying microservices as anomalous. The system 300 may include an anomaly detection service 305 and a microservice 310. The anomaly detection service 305 may include a metric aggregator 325, a model trainer 330, a model applier 335, or an ensemble 350, among others. The ensemble 350 may include a set of models 355A-N (hereinafter models 355). Embodiments may comprise additional or alternative components or omit certain components from those of FIG. 3 and still fall within the scope of this disclosure. Various hardware and software components of one or more public or private networks may interconnect the various components of the system 300. Each component in system 300 (such as the microservice 310, or the anomaly detection service 305) may be any computing device comprising one or more processors coupled with memory and software, and capable of performing the various processes and tasks described herein.

The metric aggregator 335 retrieves, identifies, or otherwise receives a set of metrics 360 from at least one microservice 310. Each microservice 310 may provide its own set of metrics 360. The metrics 360 may be acquired over at least one time period during runtime mode or training mode. The metrics 360 for the runtime mode may be acquired subsequent to training. The metrics 360 may identify or include for the model applier 335 information, data, statistics, or resources relating to the performance of each microservice 310. Each set of metrics 360 may include information relating to quantities or measurements that can be used to determine an anomaly within the microservice 310. The metric aggregator 325 may store and maintain the metrics 360 on a database upon receipt. The database can be any combination of hardware and software to store information, such as the metrics 360, for the system 300. The metric aggregator 325 may access the database to write or read information, such as the metrics 360. The metric aggregator 325 may read or write other information on the database, such as log data.

The metrics 360 may include data related to the functioning or operation of a microservice 310, such as an average response time, calls per minute, errors per minute, or full garbage collection pause time, among others. The average response time can be the mean time for the microservice 310 to respond to a call (e.g., request for performance of the microservice's function) from the application. The response time can be determined over a period of time, such as ten minutes or an hour. Calls per minute can be the total number of calls over a period of time, such as ten minutes or an hour, divided by that period of time. Errors per minute can be the total error calls during a period of time, such as ten minutes or an hour, divided by that period of time. An error call can be the microservice 310 performing its function when it has not been called, the microservice 310 failing to respond to a call, or the microservice 310 responding inadequately to a call, among others. The full garbage collection (GC) pause time can be the total GC pause time during a period of time, such as ten minutes or an hour, divided by that period of time. The garbage collection pause time can be the time when the application or operations thereof (e.g., a microservice 310) are suspended. The application can experience garbage collection pause time, for example, due to a memory of the application or the microservice 310 being full. Any or all of these data can be included in the metrics 360.

In some embodiments, the metric aggregator 325 may retrieve, receive, or otherwise identify log data. The log data may include a record of transactions, operations, or function invocations on the microservice 310. The log data may be stored periodically, such as daily or hourly, or in response to a change in the log data. The log data may also include or identify exceptions, such as a syntax exception or a null pointer exception, among others. An exception can be an error in the operation of a microservice. For example, a syntax exception can be a parsing error during the operation of a microservice. A null pointer exception can be an error in the microservice 310 performing its duty due to a null value in a call of the function. In some embodiments, an exception may halt or stall the microservice 310 from performing its function.

The metric aggregator 325 may collect the metrics 360 periodically, at scheduled intervals, or in response to a user requesting the metrics 360. For example, the metric aggregator 325 may collect the metrics 360 at intervals of ten minutes or daily. The metric aggregator 325 may collect the metrics 360 from each microservice 310 at different times or at different intervals. For example, the metric aggregator 325 may collect the metrics 360 for a first microservice at a different interval than the metric aggregator 325 collects the metrics 360 for a second microservice.

In some embodiments, the metric aggregator 325 may determine, select, or identify a time period over which to aggregate the set of metrics 360 from the microservice 310. The time period may be identified from a set of time periods corresponding to a set of tier levels (or priority or criticality levels). Each tier level may correspond to a time period for collecting the metrics 360 from the microservice 310. For example, a first microservice may have a different tier level than a second microservice. The first microservice may have its metrics 360 aggregated by the metric aggregator 325 over a period of eight weeks, whereas the second microservice may have its metrics aggregated over a period of ten weeks. The time periods may be concurrent or non-concurrent. The tier levels may correspond to a priority of the microservice 310. In some implementations, the metric aggregator 325 may more frequently or for a longer time period collect the metrics 360 for a microservice deemed to be more critical than another microservice 310. The microservice 310 may be more critical or priority if a system admin designates it so, if the microservice 310 performs its function more frequently, if the microservice 310 is necessary for functionality of the application, among other reasons. In some implementations, each microservice 310 is assigned a tier corresponding to its priority.

The metric aggregator 325 can perform various operations on the received metrics 360'. The metric aggregator 325 may filter the metrics 360. The metric aggregator 325 may filter the metrics 360 based on information within the metric (e.g., average response time, calls per minute, etc.). For example, the metric aggregator 325 may filter for only average response time, or average response time and errors per minute. The metric aggregator 325 may filter based on time. The metric aggregator 325 may discard, or conversely, only consider, data within a specified time period. For example, the metric aggregator 325 may remove or delete null values of the metrics 360. For example, the microservice 310 may not be configured to operate during a specified period of time and may therefore return null values for calls per minute in its metrics 360 during that time period. The metric aggregator 325 may remove the null values or may aggregate only during the time period of operation for the microservice 325. The metric aggregator 325 can store the filtered metrics in the database.

As a part of the various operations the metric aggregator 325 can perform on the metrics, the metric aggregator 325 may standardize the data. For example, the metric aggregator 325 may convert the metrics 360 to standard form. Standard form can refer to a data set (e.g., the metrics 360) being manipulated to have a mean of 0 and a standard deviation of 1. For example, the metric aggregator 325 may manipulate the calls per minute, the average response time, or the errors per minute, among others, to have a mean of 0 and a standard deviation of 1. Further operations of the metric aggregator 325 can include data cleaning. Data cleaning can refer to removing duplicate records (e.g., duplicate metrics or duplicate information in the metrics). For example, the metric aggregator 325 can remove or delete duplicate records at any point. Duplicate records may occur in case of any reruns or problems in the transmission of the metrics 360 to the metric aggregator 325. The microservice 325 may identify duplicate records based at least on a timestamp of the metric 360 or an identifier of the metric 360.

In some embodiments, the metric aggregator 325 may determine, detect or otherwise identify a removal of the microservice 310 to the set of microservices for the application. The metric aggregator 325 may identify the removal of the microservice 310 by a routine inventory of the set of microservices, by not receiving metrics from the microservice 310 for a period of time, by querying for the metrics 360 of the microservice 310, by a system admin indicating the removal of the microservice 310, among others. The metric aggregator 325 may cease to collect the metrics 360 from the removed microservice 310.

In some embodiments, the metric aggregator 325 may determine, detect, or otherwise identify an addition of the microservice 310 to the set of microservices for the application. The metric aggregator 325 may identify the additional microservice 310 by a hello sent from the additional microservice 310, by a routine inventorying of the microservices 310, or by a system admin indicating the addition of the microservice 310, among others. The metric aggregator 325 may collect the set of metrics 360 from the additional microservice 310. In some implementations, the metric aggregator 325 may collect the metrics 360 from the additional microservice for a period of time before performing any other operations on the metrics 360 by the anomaly detection service 305.

Upon detection of the addition, the model trainer 330 may initiate or establish the ensemble 350 of anomaly detection models. The ensemble 350 may be established on a per microservice 310 basis or a per application basis. The model trainer 330 may initiate or establish one or more ensembles 350 by training the set of models 355 using the metrics 360. The use of the ensemble 350 can reduce bias imparted by using only a single model. Furthermore, the use of the ensemble 350 can generalize (e.g., make a better fit) across the multitude of microservices 310. In some implementations, each model 355 of the ensemble 350 can be trained using a second set of metrics 360 collected prior to a first set of metrics 360. For example, the metric aggregator 325 may collect a set of metrics 360 for training the models 355 prior to collecting the metrics 360 for other operations of the anomaly detection service 305. In this example, the metric aggregator 325 may collect the metrics 360 during an 8-week period for training the models 355 via the model trainer 330. The model trainer 330 may train each of the models 355 individually. The model trainer 330 may train the models 355 with unsupervised learning. Unsupervised learning can be a machine learning method which utilizes the prior-collected metrics 360 to identify patterns within the latter-collected metrics 360'.

The models 355A-N can be a multitude of different machine learning models. The models 355 can include at least DBSCAN, K Means, Agglomerative Clustering, GMM, Elliptic Envelope, Isolation Forest, multivariate Gaussian models, or exception models, among others. Each model 355 can be trained and operate independently on the metrics 360. Each model 355 can process the metrics 360 simultaneously. Examples of the models 355 of the ensemble 350 for processing the metrics 360 are detailed herein below.

An Isolation Forest (IF) model may be used as one of the models 355 of the ensemble 350 and can be built based on one or more decision trees. Isolation Forests can view an anomaly as a data point. In an Isolation Forest, randomly sub-sampled data (e.g., the metrics 360) can be processed in a tree structure based on randomly selected features. The samples located deeply within the tree can be less likely to be anomalies as they are more difficult to isolate. Similarly, the samples which end up in shorter branches can indicate anomalies as it may be easier for the tree to separate them from other observations. The algorithm associated with the Isolation Forest model can be surmised below:
1. When given a dataset, a random sub-sample of the data can be selected and assigned to a binary tree.
2. Branching of the tree can start by selecting a random feature (e.g., data of the metrics 360). Subsequently, branching can occur on a random threshold (any value in the range of minimum and maximum values of the selected feature).
3. If the value of a data point (e.g., feature) is less than a selected threshold, it goes to the left branch. Otherwise, the data point may go to the right. Accordingly, a node can be split into left and right branches.
4 This process from step 2 can be continued recursively until each data point is completely isolated or until a max depth of the binary tree (if defined) is reached.
5. The above steps are repeated to construct random binary trees.

An anomaly score can be assigned to each of the data points based on the depth of the tree required to arrive at that point. This score can be an aggregation of the depth obtained from each of the trees. In some implementations, an anomaly score of −1 can be assigned to anomalies and 1 to normal points based on the percentage of anomalies present in the data.

A Density-Based Spatial Clustering of Applications with Noise (DBSCAN) may be used as one of the models 355 of the ensemble 350. The DBSCAN model can be a data clustering algorithm. In some implementations, DBSCAN groups together data points (e.g., of the metrics 360) that are close to each other based on a distance measurement (e.g., Euclidean distance) and a minimum number of data points. It also can mark as outliers the data points that are in a low-density region. DBSCAN may be able to find arbitrary shaped clusters and clusters with noise (e.g., outliers). In other words, DBSCAN may determine that a point belongs to a cluster if that data point is close to many points from that cluster. The algorithm associated with DBSCAN can be surmised below:
1. A first point can be selected at random. A neighborhood area can be determined using a selected radius. If there are at least a minimum number of points in the neighborhood, the first point is marked as core point and a cluster formation can start. If not, the first point can be marked as noise. Once a cluster formation starts, all the points within the neighborhood of the first point can be included in the cluster. If these new points are also core points, the points that are in the neighborhood of them are also added to the cluster.
2. Then, a second point can be randomly chosen from the points that have not been visited in the previous steps. The procedure of step 1 then applies.
3. The process can terminate when all points are visited.

The multivariate Gaussian (Normal) distribution model may be used as one of the models 355 of the ensemble 350. The multivariate Gaussian distribution model can take into account how data of the metrics 360 change with other data of the metrics 360. The model can include a co-variance matrix based on the metrics 360. This model can account for the covariance between all the data of the metrics 360 by utilizing the power of the covariance matrix. This model can form a normal distribution graph of the metrics 360. The algorithm associated with the multivariate Gaussian distribution model can be surmised below:
1. Identify the mean of a set of training metrics.
2. Identify the covariance of the set of training metrics.
3. Calculate a probability of a value of the metrics 360 being equal to each and every value of the metrics 360.
4. Calculate the probability for all the values of the metrics 360. This probability value can be used to identify (either by comparing against a threshold or by probability values of all the metrics 360) the anomaly or outlier.

Natural language processing (NLP) may also be used as one of the models 355 of the ensemble 360. The NPL model accepts the log data instead of or in addition to the metrics 360 and may apply any number of NLP techniques, such as information retrieval (IR), information extraction (IE), and semantic analysis, among others. The exception model may process the log data to identify exceptions, such as a JSON exception. In some implementations, with the identification of an exception, a separate ensemble 350 of models can be applied to the log data. The separate ensemble can include the models 355 trained with and processing the log data collected by the metric aggregator 325. These models and others not identified herein can be trained by a set of metrics 360 to operate on a latter set of metrics 360.

With the establishment of the ensemble 350, the model applier 335 applies or feeds the metrics 360 to each model 355 of the ensemble 350. In some embodiments, the model applier 335 may apply the log data to the exception detection model. At least one of the classifications 365 can be determined through the log data for the microservice 310. In feeding, the model applier 335 may input the metrics 360 into each model 355 and process the metrics 360 in accordance with the architecture and specifications of each model 355. From processing, the model applier 335 may produce, output, or otherwise generate a set of classifications 365A-N (hereinafter generally referred to as classifications 365) from the corresponding set of models 355. For example, the model applier 335 may input the metrics 360 into a feature space defined by a clustering model (e.g., one of the models 355) and find a region in which the metrics 360 reside for the output.

Each of the classifications 365 can identify or indicate the metrics 360 for the microservice 310 as being anomalous or normal. Each model 355 can determine whether the microservice 310 is experiencing or had experienced an anomaly event. An anomaly event can be correlated to the metrics 360 of the microservice 310 corresponding to the anomaly event being anomalous. Anomalous can refer to the microservice 310 (or its metrics 360 indicating thus) not performing as intended or malfunctioning. Normal can refer to the microservice 310 performing its function as intended. The classification 355 determined through the log data can identify an exception, such as a JSON exception, of the log data.

Figure 4:
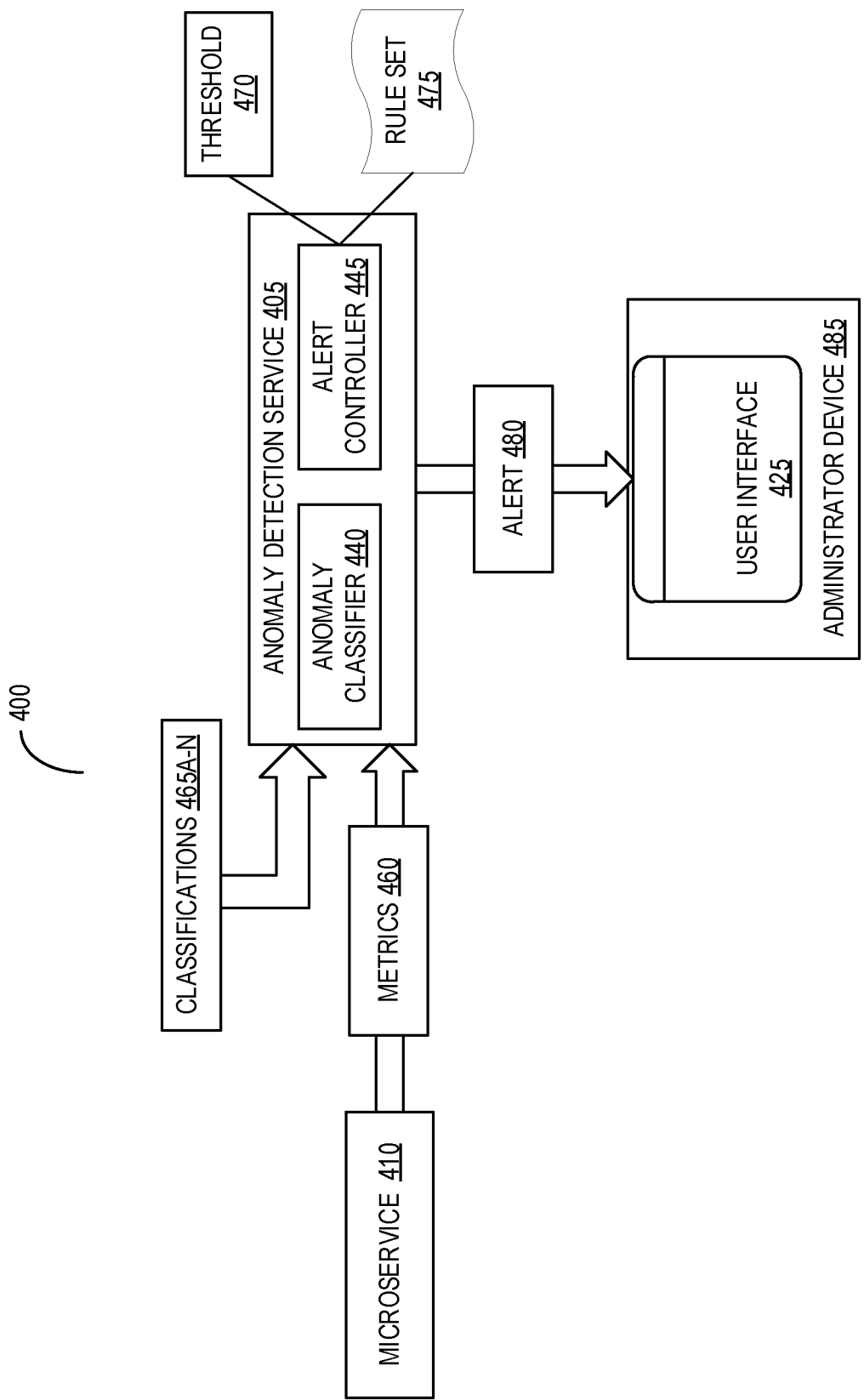
FIG. 4 illustrates a block diagram of an example system for issuing alerts for anomalies in microservices in accordance with an illustrative embodiment.

FIG. 4 depicts a block diagram of a system 400 for issuing alerts for anomalies in microservices. The system 400 may include a microservice 410, a threshold 470, an anomaly detection service 405, metrics 460, a rule set 475, an alert 480, or an administrator device 485. The anomaly detection service 405 may include at least an anomaly classifier 440 or an alert controller 445. Embodiments may comprise additional or alternative components or omit certain components from those of FIG. 4 and still fall within the scope of this disclosure. Various hardware and software components of one or more public or private networks may interconnect the various components of the system 400. Each component in system 400 (such as the microservice 410A, the anomaly detection service 405, the alert 480, or the administrator device 485) may be any computing device comprising one or more processors coupled with memory and software, and capable of performing the various processes and tasks described herein.

With the generation of classifications for a set of metrics, the anomaly classifier 440 may obtain, acquire, or otherwise identify the classifications 465 from the ensemble of models. To identify, the anomaly classifier 440 may count a number of classifications 465 indicating the metrics 460 as anomalous and a number of classifications 465 indicating the metrics 460 as normal. The anomaly classifier 440 may determine or identify whether a majority or minority of the classifications 465 are anomalous. Based on the counts, the anomaly classifier 440 may determine if at least a majority or a minority of the models identifies the classifications 465 as anomalous. A majority of the classifications 465 being identified as anomalous may indicate an anomaly event in a corresponding microservice 410.

When the majority of classifications 465 are anomalous, the alert controller 445 determines whether to proceed with or suppress generation of an alert 480. The alert 480 may be to indicate an anomaly event in the microservice 410. The alert 480 can be a notification message (e.g., Short Messaging Service (SMS), multimedia messaging service (MMS), or email) to indicate to at least a system administrator that the microservice 410 is experiencing an anomaly event. Additional checks may be performed by the alert controller 445 to determine whether to proceed with suppressing or providing the alert 480. When the minority (e.g., less than majority) of classifications 465 are anomalous, the alert controller 445 may refrain from or otherwise suppress generation of the alert 480.

In some embodiments, the alert controller 445 may determine whether at least one of the set of metrics 460 satisfies a threshold 470. The threshold 470 can determine whether or not to suppress the alert 480. For example, one or more of the set of metrics 460 may not satisfy the threshold 470. In this example, the alert 480 may be suppressed for the metric 460 not satisfying the threshold 470. Conversely, one or more of the set of metrics 460 may satisfy the threshold 470. Upon satisfying the threshold 470, the alert controller 445 may not suppress the alert 480. The threshold 470 can be determined by the alert controller 445.

In some embodiments, the alert controller 445 may determine the threshold 470 with which to compare a respective metric of the set of metrics 460. The alert controller 445 may use a second set of metrics 460 to determine the threshold 470 with which to compare a respective metric of the set of metrics 460. For example, the alert controller 445 may create a statistical analysis of the second set of metrics 460 over a period of time. In some implementations, the second set of metrics 460 can be received prior to the set of metrics 460. The alert controller 445 may determine the threshold 470 based on a percentile of the second set of metrics 460. For example, the alert controller 445 may set the threshold 470 at a 0.995 percentile of the second set of metrics 460. In this example, this 0.995 percentile threshold 470 can be applied to the set of metrics 460. In some implementations, if the set of metrics 460 meets the threshold 470 of 0.995 percentile, the alert controller 445 may not suppress the alert 480.

In some embodiments, the alert controller 445 may determine whether at least one of the set of metrics 460 satisfies the rule set 475 to avoid false positives. The rule set 475 can include ranges of values for the metrics 460 to generate or suppress the alert 480. The rule set 475 can include conditions for information of the metrics 460 to satisfy. For example, the rule set 475 can identify when all of the metrics 460 except for "error per minute" is within a threshold (e.g., the threshold 470 or another threshold) and errors per minute is less than 10, when the "errors per minutes" is less than 1% of the "calls per minute" value, when all but one of the metrics 460 is within the threshold and the one metric is below a second threshold, among others. The satisfaction of a rule of the rule set 475 may avoid false positives in anomaly detection. In some implementations, if the metrics 460 satisfy the rule set 475, the alert controller 445 may suppress the alert 480.

If the metrics 460 do not satisfy the threshold 460 or the rule set 475, the alert controller 445 may suppress the alert 480 to provide for the microservice 410. Suppressing the alert 480 may refer to the alert controller 445 not generating the alert 480, not transmitting the alert 480, or not displaying the alert 480 on the user interface 425. Suppression of the alert 480 may indicate that the microservice 410 is not experiencing an anomaly event. Suppression of the alert 480 may indicate that the metrics 460 indicate a false positive. In some embodiments, a rule of the rule set 475 or the threshold 470 may correspond to a suppression of the alert 480. For example, a rule of the rule set 475 could be related to a number of suppressions for a given metric 460 of the microservice 410 over a period of time.

Conversely, if the metrics 460 satisfy the threshold 470, the alert controller 445 may produce, output, or otherwise generate the alert 480 to for the microservice 410 to present via the user interface 425 operating on the administrator device 485. In some implementations, if the metrics 460 do not satisfy the rule set 475, the alert controller 445 may maintain the alert 480. In this manner, the anomaly detection service 405 has determined that it is not a false positive, and thereby the alert 480 should be generated.

The administrator device 485 may render, display, or otherwise present the user interface 425 for the alert 480. In some embodiments, the alert controller 445 may also provide information for presentation on the user interface 425.

The alert 480 can be presented on the user interface 425 of an administrator device 485. For example, the alert 480 may be presented as a prompt on a user interface 425 or an email message in the inbox of a mail agent application on the administrator device 485. In some implementations, the user interface 425 can be a dashboard displaying at least the microservices 410, the application, the alert 480, the respective function of each microservice 410, the classifications 465, or a set of metrics 460, among others. For example, the dashboard can display the name of the microservice 410, the errors per minute of that microservice 410, the garbage collection count per minute of that microservice 410, the calls per minute of that microservice 410, among other metrics. An example of the dashboard presented via the user interface 425 is detailed herein in conjunction with FIG. 5.

In this manner, microservice anomalies can be more efficiently and precisely detected and displayed. Detecting and displaying anomalies by these means can reduce the use of computational resources through preventing false positive alerts from being generated and presented. The anomaly detection service may use the ensemble of models to reduce false positives at several points (e.g., during modeling by the models, classification by the mode applier, and suppression by the anomaly classifier and the alert controller). Additionally, the classification of the metrics by the anomaly detection service can create a history of anomalous microservices or metrics. These facets can lend themselves to providing concise information to a system administrator. More efficient anomaly detection can lead to faster resolution of problematic microservices. This can create a framework to monitor the performance of critical microservices and trigger alerts proactively whenever the microservice's metrics seem anomalous. This framework can thereby improve the functionality of the application and the human-computer interaction by reducing computational resources spent on malfunctioning microservices by more quickly targeting and resolving failures.

Figure 5:
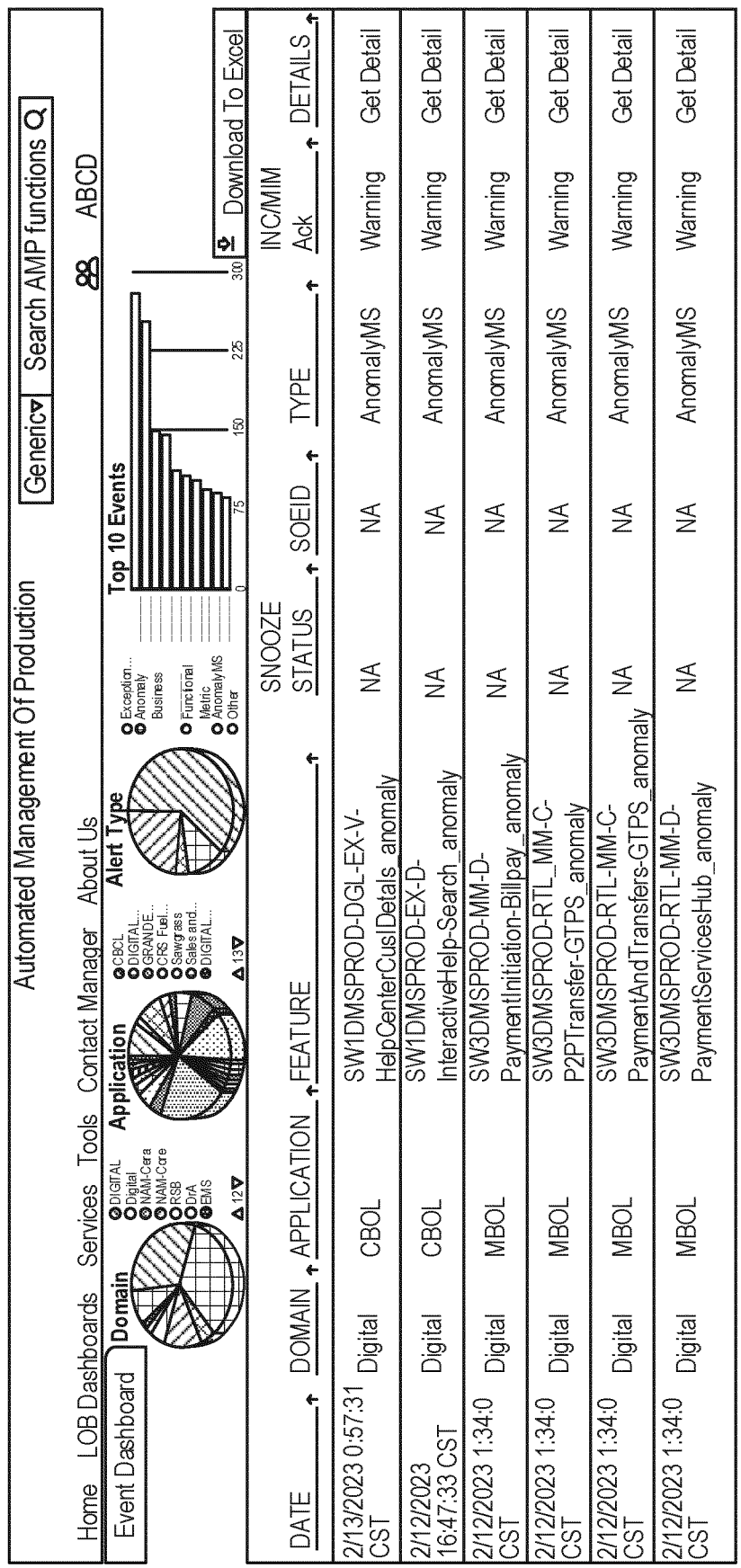
FIG. 5 illustrates a dashboard for microservice anomaly detection in accordance with an illustrative embodiment.

FIG. 5 depicts a dashboard 500 for microservice anomaly detection. The dashboard 500 can be an example dashboard that may be generated by an administrator device. The information displayed by the dashboard 500 may be populated at least from a database of the system, the anomaly detection service (including at least the alert controller, the metric aggregator, the model applier, or the model trainer). The dashboard 500 may display the metrics, the microservice (e.g., an identifier of the microservice), the classifications generated by the models, a timestamp, the alert generated by the alert controller, or details related to an anomaly, among others. For example, the dashboard 500 may depict each anomaly event detected by the system. In some embodiments, the dashboard 500 can show details (e.g., type of anomaly, time of anomaly, microservices affected, among others) and volume of each anomaly event. Each anomaly event displayed may contain a feature. A feature can be indicative of the location of the anomaly. For example, a feature can indicate a function call of the microservice that may be the source of the anomaly event.

The dashboard 500 may display charts and graphs (e.g., pie charts, bar graphs, histograms, etc.) of information depicted in the dashboard 500. The dashboard 500 may depict a pie chart showing the percentage of alert types, or a bar graph indicating the most frequent anomaly events. For example, a pie chart may indicate the applications experiencing the most anomaly events within their respective microservices. A pie chart may exhibit a percentage of the alert types (e.g., an exception, an anomaly event, among others). The charts and graphs may be user customizable. For example, a system administrator may choose the metrics, microservices, or other data of the dashboard 500 to make graphs of. As an illustrative example, the system administrator may select a microservice and its top ten anomaly events for display in a bar graph showing the relation of frequency of each anomaly event to the other for a period of time. In some embodiments, the dashboard 500 can include a snooze feature. The snooze feature may enable a system administrator to suppress an alarm presented on the dashboard 500. The snooze feature may enable a time-based suppression. For example, a system admin may choose to snooze an alarm for five minutes, 24 hours, or another period of time. The snooze feature may enable a switched snooze, wherein the alert is suppressed until the system administrator chooses to remove the suppression.

Figure 6:
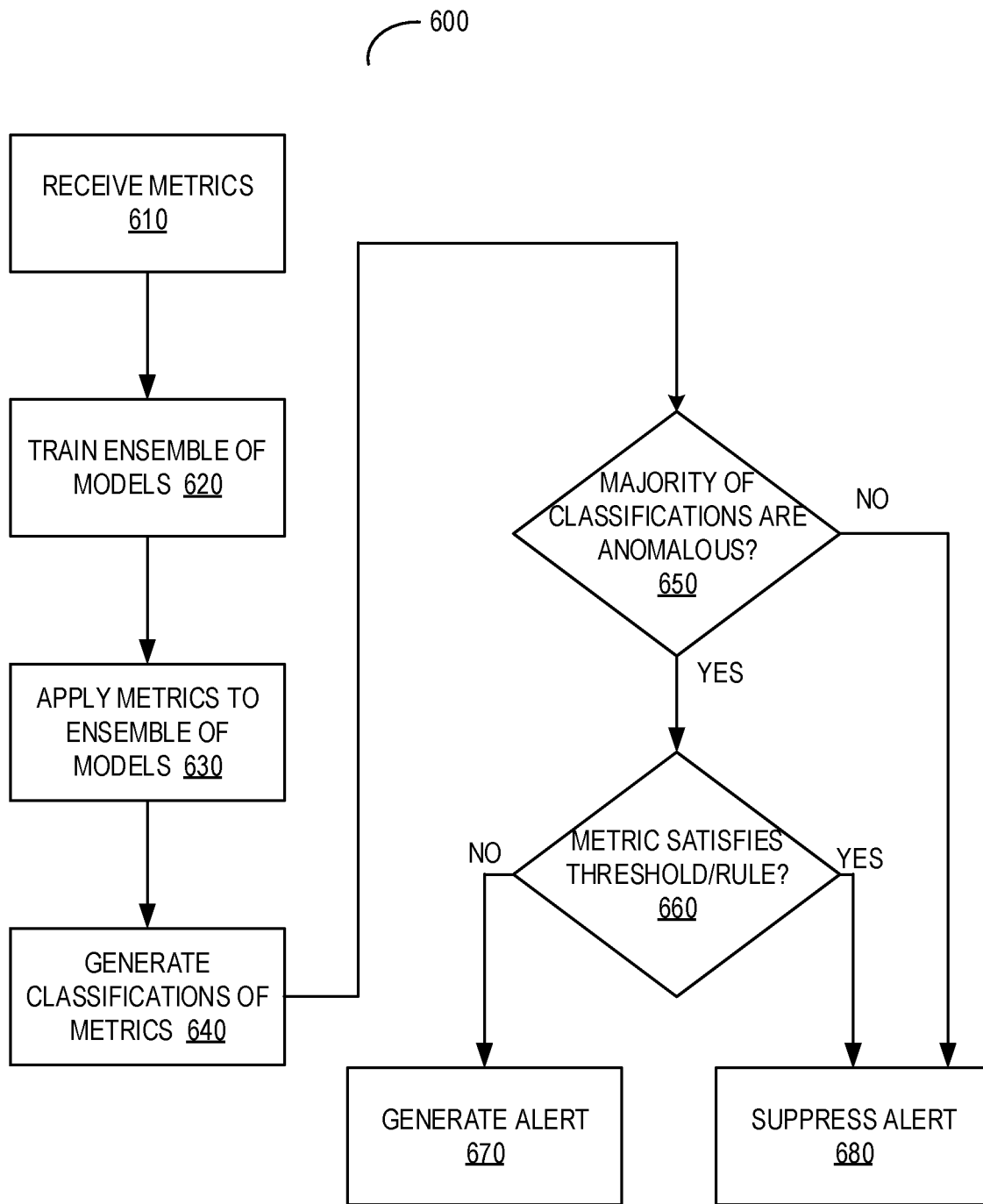
FIG. 6 illustrates a flow diagram of an example method of identifying anomalies in microservices with an illustrative embodiment.

FIG. 6 depicts a flow diagram of an example method of identifying anomalies in microservices. Embodiments may include additional, fewer, or different operations from those described in the method 600. The method 600 may be performed by a server executing machine-readable software code, though it should be appreciated that the various operations may be performed by one or more computing devices and/or processors. At step 610, the server receives metrics. The server may receive metrics from one or more microservices. The metric aggregator may aggregate the metrics received from the one or more microservices. The metric aggregator may perform any number of operations on the metrics, including storing the metrics in the database, filtering the metrics, removing null values from the metrics, among others.

At step 620, the server trains an ensemble of models. The ensemble of models can be trained by the model trainer using at least a subset of the metrics received by the metric aggregator. The ensemble of models can include at least two or more machine learning models. Each of the machine learning models can be a different machine learning model and can each be trained using the subset of metrics. At step 630, the server applies the metrics to the ensemble of models. The model applier can apply the metrics, including or excluding the subset of metrics, to each model of the ensemble. Apply the metrics can refer to feeding the metrics to each model. At step 640, the server generates classifications of metrics. The model applier can generate classifications of the metrics using the trained models. The classifications can include at least a normal classification or an anomalous classification. In some embodiments, the classifications can include an exception classification.

At step 650, the server determines whether a majority of the classifications are anomalous. The server can determine whether a majority of classifications are anomalous using a majority voting of the models. For example, if a majority (e.g., more than 50%) of the models classify a metric as anomalous, the metric can be determined to be anomalous. In some implementations, the number of models of the ensemble are three. At step 680, if the majority of classifications are not anomalous, the server can suppress the alert. At step 660, if the majority of classifications are anomalous, the server determines whether the metrics satisfy a threshold or a rule. The metrics can satisfy a threshold relating to historical data of the microservice. For example, the metrics for a microservice can be aggregated over a time period and used to determine a statistical distribution of the metrics. The threshold can be at a percentile of the historical metrics. In some embodiments, the service may determine whether the metrics satisfy a rule to avoid false positives. The rule of the rule set can relate at least to conditionals of the values of the metrics.

At step 670, if the metrics satisfy a threshold, the server generates an alert. The server can generate an alert to transmit to a system administrator. The alert can be, for example, an email notification to the system administrator. The alert can be presented on a dashboard interface. At step 680, if the metrics do not satisfy the threshold, the server suppresses the alert. Suppressing the alert can refer to the alert controller not generating an alert or not transmitting the alert to the system admin. The alert can be suppressed if the server determines the alert to be a false positive.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then" and "next," among others, are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, among others, may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising: receiving, by a server, a first plurality of metrics over a first time period from a defined set of microservices for one or more functions;

applying, by the server, the first plurality of metrics to an ensemble of anomaly detection models to generate a plurality of classifications, each of the plurality of classifications indicating the first plurality of metrics as one of anomalous or normal from a respective model of the ensemble of anomaly detection models, wherein the ensemble of anomaly detection models is trained using a second plurality of metrics over a second time period;

identifying, by the server, a majority of the plurality of classifications as anomalous;

determining, by the server, responsive to identifying the majority of the plurality of classifications as anomalous, that at least one of the first plurality of metrics satisfies a threshold for the defined set of microservices, wherein determining that the first plurality of metrics does not satisfy a rule defining the threshold, and further comprising: maintaining, by the server, the alert to indicate the anomaly in response to determining that the first plurality of metrics does not satisfy the rule; and generating, by the server, an alert to indicate an anomaly in the defined set of microservices for the one or more functions, in response to determining that the at least one of the first plurality of metrics satisfies the threshold.

2. The method of claim 1, further comprising:
identifying, by the server, an addition of a microservice to the defined set of microservices for the one or more functions; and
training, by the server, the ensemble of anomaly detection models using a third plurality of metrics from the microservice aggregated over a third time period.

3. The method of claim 1, wherein determining that at least one of the first plurality of metrics satisfies the threshold further comprises determining that the first plurality of metrics satisfy a rule defining the threshold, and further comprising:
suppressing, by the server, the alert to indicate the anomaly in response to determining that the first plurality of metrics satisfy the rule.

4. The method of claim 1, further comprising removing, by the server, at least one microservice from the defined set of microservices, responsive to determining that at least one of: (i) at least one of the first plurality of metrics satisfies the threshold or (ii) lack of metrics for the at least one microservice for a defined time period.

5. The method of claim 1, further comprising suppressing, by the server, responsive to identifying less than the majority of the plurality of classifications as anomalous, generation of the alert to indicate the anomaly in the defined set of microservices.

6. The method of claim 1, further comprising providing, by the server, for presentation on a dashboard interface, information based on at least one of: (i) the defined set of microservices, (ii) the first plurality of metrics over the first time period, (iii) the plurality of classifications, or (iv) the alert to indicate the anomaly.

7. The method of claim 1, wherein receiving the first plurality of metrics further comprises receiving the first plurality of metrics over the first time period in accordance with a tier level for the defined set of microservices.

8. The method of claim 1, wherein generating the alert further comprises generating a message to indicate, to an administrator device, the anomaly in the defined set of microservices for the one or more functions.

9. The method of claim 1, wherein each of the defined set of microservices are configured to provide at least a portion of the one or more functions for an application.

10. A system, comprising: a server having one or more processors coupled with memory, configured to:
receive a first plurality of metrics over a first time period from a defined set of microservices for one or more functions;
apply the first plurality of metrics to an ensemble of anomaly detection models to generate a plurality of classifications, each of the plurality of classifications indicating the first plurality of metrics as one of anomalous or normal from a respective model of the ensemble of anomaly detection models, wherein the ensemble of anomaly detection models is trained using a second plurality of metrics over a second time period;
identify a majority of the plurality of classifications as anomalous;
determine, responsive to identifying the majority of the plurality of classifications as anomalous, that at least one of the first plurality of metrics satisfies a threshold for the defined set of microservices, wherein determine that the first plurality of metrics does not satisfy a rule defining the threshold; and maintain the alert to indicate the anomaly in response to determining that the first plurality of metrics does not satisfy the rule; and
generate an alert to indicate an anomaly in the defined set of microservices for the one or more functions, in response to determining that the at least one of the first plurality of metrics satisfies the threshold.

11. The system of claim 10, wherein the server is further configured to:
identify an addition of a microservice to the defined set of microservices for the one or more functions; and
train the ensemble of anomaly detection models using a third plurality of metrics from the microservice aggregated over a third time period.

12. The system of claim 10, wherein the server is further configured to:
determine that the first plurality of metrics satisfy a rule defining the threshold; and
suppress the alert to indicate the anomaly in response to determining that the first plurality of metrics satisfy the rule.

13. The system of claim 10, wherein the server is further configured to remove at least one microservice from the defined set of microservices, responsive to determining that at least one of: (i) at least one of the first plurality of metrics satisfies the threshold or (ii) lack of metrics for the at least one microservice for a defined time period.

14. The system of claim 10, wherein the server is further configured to suppress, responsive to identifying less than the majority of the plurality of classifications as anomalous, generation of the alert to indicate the anomaly in the defined set of microservices.

15. The system of claim 10, wherein the server is further configured to provide, for presentation on a dashboard interface, information based on at least one of: (i) the defined set of microservices, (ii) the first plurality of metrics over the first time period, (iii) the plurality of classifications, or (iv) the alert to indicate the anomaly.

16. The system of claim 10, wherein the server is further configured to receive the first plurality of metrics over the first time period in accordance with a tier level for the defined set of microservices.

17. The system of claim 10, wherein the server is further configured to generate a message to indicate, to an administrator device, the anomaly in the defined set of microservices for the one or more functions.

18. The system of claim 10, wherein each of the defined set of microservices are configured to provide at least a portion of the one or more functions for an application.

* * * * *